(12) United States Patent
Schaefer et al.

(10) Patent No.: US 12,570,044 B2
(45) Date of Patent: Mar. 10, 2026

(54) PIVOTING BUILDING PLATFORM FOR CREATING A PARALLEL BUILDING PLANE

(71) Applicant: DENTSPLY SIRONA Inc., York, PA (US)

(72) Inventors: Thomas Schaefer, Darmstadt (DE); Christian Stahl, Darmstadt (DE); Christian Schmidt, Bensheim (DE); Peter Fornoff, Oberkainsbach (DE)

(73) Assignee: Dentsply Sirona Inc., York, PA (US)

( * ) Notice: Subject to any disclaimer, the term of this patent is extended or adjusted under 35 U.S.C. 154(b) by 0 days.

(21) Appl. No.: 18/577,808

(22) PCT Filed: Jul. 12, 2022

(86) PCT No.: PCT/EP2022/069379
§ 371 (c)(1),
(2) Date: Jan. 9, 2024

(87) PCT Pub. No.: WO2023/285417
PCT Pub. Date: Jan. 19, 2023

(65) Prior Publication Data
US 2024/0375352 A1     Nov. 14, 2024

(30) Foreign Application Priority Data
Jul. 12, 2021    (EP) ..................................... 21184987

(51) Int. Cl.
B29C 64/245        (2017.01)
B29C 64/124        (2017.01)
(Continued)

(52) U.S. Cl.
CPC .......... B29C 64/245 (2017.08); B29C 64/124 (2017.08); B29C 64/236 (2017.08);
(Continued)

(58) Field of Classification Search
None
See application file for complete search history.

(56) References Cited

U.S. PATENT DOCUMENTS

| | | | |
|---|---|---|---|
| 2010/0196526 A1* | 8/2010 | Yasukochi | ............ B29C 64/135 425/174.4 |
| 2013/0075954 A1 | 3/2013 | Gregory, II et al. | |

FOREIGN PATENT DOCUMENTS

| | | | |
|---|---|---|---|
| CN | 209478957 U | * | 10/2019 |
| CN | 209813088 U | | 12/2019 |

(Continued)

OTHER PUBLICATIONS

"International Application Serial No. PCT/EP2022/069379, International Preliminary Report on Patentability mailed Jan. 25, 2024", 11 pgs.

(Continued)

*Primary Examiner* — Yung-Sheng M Tsui
*Assistant Examiner* — Melody Tsui
(74) *Attorney, Agent, or Firm* — SCHWEGMAN LUNDBERG & WOESSNER, P.A.

(57) ABSTRACT

The disclosure relates to a 3D printer including: a vat having an at least partially transparent bottom for receiving liquid photoreactive resin for producing a solid component; a building platform for pulling the component layer by layer out of the vat; a projector for projecting the layer geometry onto the transparent bottom; a transport apparatus for moving the building platform at least downward or upward in the vat; and a receiving apparatus for detachably connecting the building platform to the transport apparatus. The receiving apparatus includes a pivoting device for pivotally holding the building platform and is adapted to abut the underside of the building platform parallelly onto the transparent bottom of the vat when lowered by the transport apparatus. The 3D (Continued)

printer is provided without for the ability to completely block the pivotal movement of the pivotably held building platform.

7 Claims, 2 Drawing Sheets

(51) Int. Cl.

| | | |
|---|---|---|
| *B29C 64/236* | (2017.01) | |
| *B29C 64/255* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC .......... *B29C 64/255* (2017.08); *B29C 64/393* (2017.08); *B33Y 10/00* (2014.12); *B33Y 30/00* (2014.12); *B33Y 50/02* (2014.12)

(56) References Cited

FOREIGN PATENT DOCUMENTS

| | | | | | |
|---|---|---|---|---|---|
| CN | 111497232 | A | | 8/2020 | |
| CN | 212708033 | U | * | 3/2021 | |
| CN | 113665102 | A | * | 11/2021 | ........... B29C 64/129 |
| EP | 4370307 | B1 | | 8/2025 | |
| KR | 20170105526 | A | * | 9/2017 | ............. B29C 64/40 |
| WO | WO-2023285417 | A1 | | 1/2023 | |
| WO | WO-2023066935 | A1 | * | 4/2023 | ........... B29C 64/236 |

OTHER PUBLICATIONS

"International Application Serial No. PCT/EP2022/069379, International Search Report mailed Oct. 11, 2022", 4 pgs.
"International Application Serial No. PCT/EP2022/069379, Written Opinion mailed Oct. 11, 2022", 9 pgs.

* cited by examiner

PIVOTING BUILDING PLATFORM FOR CREATING A PARALLEL BUILDING PLANE

CROSS-REFERENCE TO RELATED APPLICATIONS

This is a National Phase application of International Application No. PCT/EP2022/069379, filed Jul. 12, 2022, which claims the benefit of and priority to European Application Ser. No. 21184987.2, filed on Jul. 12, 2021, which are herein incorporated by reference for all purposes.

TECHNICAL FIELD OF THE INVENTION

The present invention relates to 3D printers, and more particularly to the component carrier or building platform of a 3D printer.

BACKGROUND OF THE INVENTION

In 3D printing using the DLP process, photoreactive resins are cured layer by layer with light (usually UV light). In the so-called bottom-up process, a projector is located below the resin bath (see FIG. 1). The resin bath is located in a vat with a transparent bottom, typically a foil, on which the layer geometry is projected. After a layer is cured, the building platform is moved up to form a gap for the next layer to be cured, wherein, the cured layer is peeled off from the bottom of the vat. At the start of a print job, the first layer must be attached to the building platform in such a way as to ensure a secure adhesion to the building platform despite the peeling forces. Since the curing depth is limited due to the process, the projection plane on the transparent bottom and the underside of the building platform must have a high degree of parallelism. If the two planes are not sufficiently parallel, complete adhesion of the print job to the building platform is not ensured and the print job cannot be executed.

The parallelism can be achieved, for example, by adjusting the building platform before each 3D print job. Without an intervention before each print job, the parallelism depends, among other things, on the tolerances of the building platform and the vat bottom. The building platform and vat are typically used on multiple 3D printers of the same type. This means that when changing to a different printer, they must be aligned again before a print job.

SUMMARY OF THE INVENTION

An objective of the present invention is to provide a 3D printer in which the parallelism between the projection plane and building platform plane can be established without adjustment. This eliminates the need for low component tolerances with respect to parallelism or a separate building platform adjustment process prior to each print job.

Another objective of the present invention is to provide a 3D printer in which a parallel plane can be generated by process control after the first layers.

These objectives are achieved by the 3D printer according to claim 1, and the control method according to claim 6. The subject-matters of the dependent claims relate to further developments and preferred embodiments.

The 3D printer according to the invention comprises a vat having an at least partially transparent bottom for receiving liquid photoreactive resin for producing a solid component; a building platform for pulling the component layer by layer out of the vat; a projector for projecting the layer geometry onto the transparent bottom; a transport apparatus for moving the building platform downward or upward in the vat; and a receiving apparatus for detachably connecting the building platform to the transport apparatus. The receiving apparatus according to the invention has a pivoting device for pivotably holding the building platform and is adapted to abut the underside of the building platform parallel against the transparent bottom of the vat when lowered by the transport apparatus. According to the present invention, unlike the prior art, the 3D printer (1) is provided without any means for completely blocking the pivotal movement of the pivotably held building platform. Therefore, during the entire 3D printing process, namely in the use state, the building platform can be held freely pivotably.

A key feature of the invention is that a parallel plane is created by the movable, in particular pivoting mounting of the building platform and by the process control after the first layers.

According to the method of controlling a 3D printer of the invention, the building platform is lowered, preferably in a force-controlled manner, until it lies parallel on the projection plane; the building platform is then moved upwards and set one layer thickness higher; the projection now preferably takes place over one or more pre-defined areas which may be equal or less than the entire maximum projectable area; if the gap below the building platform is not parallel, the resin hardens only where it is located in the gap; after repeated peeling off, upwards moving, re-setting one further layer-thickness higher and projecting over the one or more pre-defined areas, one or more wedges are formed under the building platform, the underside of which is parallel to the projection plane. The positions of the one or more wedges may be defined by the first layer of the component. First after completion of the one or more wedges the component and its support structures are layer-wise formed on the one or more wedges by projecting the layer geometries thereof.

Another key feature of the present invention is that by virtue of the process control for creating one or more wedges under the building platform, the underside of which is parallel to the projection plane, it becomes possible to dispense with any blocking means for completely blocking/fixing/arresting the pivotal movement of the pivotably held building platform during the 3D printing process. Thereby the user can be freed from performing a blocking adjustment. Thereby, the costs for such blocking means can be saved. Furthermore, a comparatively lightweight pivoting device can be manufactured which improves the operability and usability of the 3D printer.

An advantageous effect of the invention is that low tolerances in the parallelism of the building platform to the projection plane or a separate adjustment process before each print job can be dispensed with.

In a preferred embodiment, the 3D printer preferably comprises a force measuring device for force-controlled lowering and raising of the building platform.

In a preferred embodiment, the pivoting device has a rotating joint for holding the building platform. Preferably, the rotating joint is a ball joint. Alternatively, other articulated joints known to those skilled in the art that allow for pivotal movement can be used. In addition to an explicit articulated joint, it is also possible to flexibly hold the building platform using elastomeric elements or spring-like elements.

In a preferred embodiment, the building platform is preferably spring-supported within the receiving apparatus.

In a preferred embodiment, the receiving apparatus is provided as an independent, stand-alone unit that is provided separately to the customer for retrofitting an existing 3D printer. By eliminating the blocking means, the weight, the number of parts and the size of the pivoting device can be reduced, thus costs can be saved, and the operability and user friendliness can be further improved. The receiving apparatus has a connection device, preferably a receiving arm, which can be detachably connected to the transport apparatus. The connection can be a form-fitting and/or force-fitting connection such as a plug-in connection, screw connection, etc.

In a preferred embodiment, the projector is also adjustable so that the focal surface is adjustable in height as well as rotatably adjustable in the horizontal longitudinal direction and horizontal transverse direction of the transparent bottom of the vat to allow adjustment to the projection plane on the transparent bottom of the vat.

BRIEF DESCRIPTION OF THE DRAWINGS

In the following description, the present invention will be explained in more detail by means of embodiments with reference to the drawings, wherein.

DETAILED DESCRIPTION OF THE INVENTION

Figure 1:
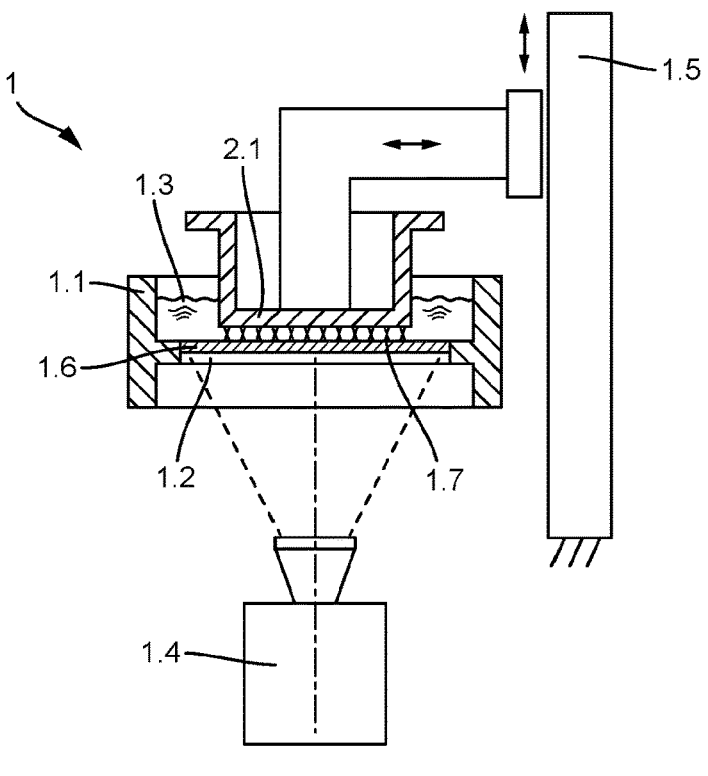
FIG. 1—shows a schematic partial view of an ideal 3D printer according to the prior art.
Figure 2:
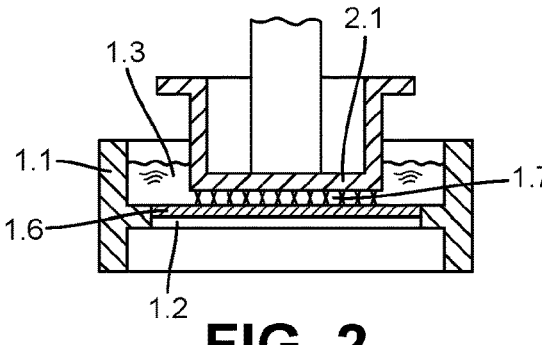
FIG. 2—shows a schematic partial view of the 3D printer from FIG. 1 at the beginning of a print job.
Figure 3:
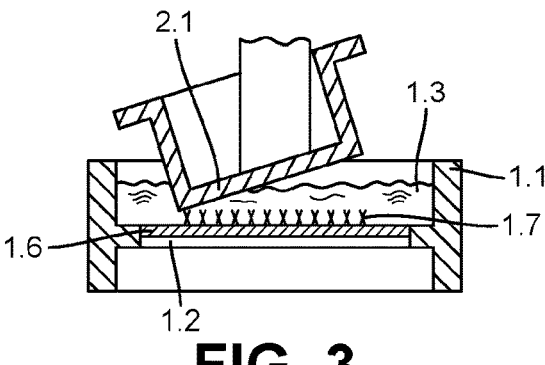
FIG. 3—shows a schematic partial view of a non-ideal 3D printer according to the prior art in which the projection plane and building platform plane do not have sufficient parallelism.

The reference numbers shown in the drawings designate the elements listed below, which are referred to in the following description of the exemplary embodiments.
1 3D printer
1.1 Vat
1.2 Transparent bottom
1.3 Photoreactive resin
1.4 Projector
1.5 Transport apparatus
1.6 Foil
1.7 Layer
1.8 Wedge
2 Receiving apparatus
2.1 Building platform
2.2 Pivoting device
2.21 Receiving arm
2.22 Rotating joint
2.221 Spring
2.222 Pin
2.223 Hole As a comparative example, FIG. 1 shows a schematic partial view of an ideal 3D printer according to the prior art. In 3D printing using the DLP process, photoreactive resins (1.3) are cured layer by layer with light (usually UV light). In the so-called bottom-up process, a projector (1.4) is located below the vat (1.1) or the resin bath. The resin bath is located in the vat (1.1), which has a transparent bottom (1.2), preferably a foil (1.6), onto which the layer geometry is projected. After a layer (1.7) has been cured, the building platform (2.1) is moved up by the transport apparatus (1.5) to form a gap for the next layer to be cured. At the beginning of a print job, the first layer (1.7) must be adhered to the building platform (2.1) (see FIG. 2). Since the curing depth is limited due to the process, the projection plane and the building platform plane must have a high degree of parallelism. If the two planes are not parallel, complete adhesion of the print job to the building platform (2.1) is not secured and the print job cannot be executed (see FIG. 3).

Figure 4:
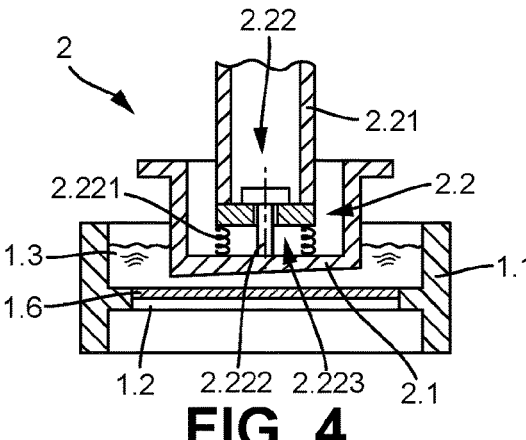
FIG. 4—shows a schematic partial view of a 3D printer according to one embodiment of the invention.

FIG. 4 shows a schematic partial view of a 3D printer according to one embodiment of the invention. The 3D printer according to the invention comprises a vat (1.1) with an at least partially transparent bottom (1.2) for receiving the liquid photoreactive resin (1.3) for producing a solid component; a building platform (2.1) for pulling out the component layer by layer out from the vat; a projector (1.4) for projecting the layer geometry onto the transparent base (1.2); a transport apparatus (1.5) for moving the building platform (2.1) downward or upward in the vat (1.1); and a receiving apparatus (2) for detachably connecting the building platform (2.1) to the transport apparatus (1.5). Unlike the comparative example in FIG. 1, the receiving apparatus (2) according to the invention has a pivoting device (2.2) for pivotably holding the building platform (2.1), and is adapted, when lowered by the transport apparatus (1.5), to abut the underside of the building platform (2.1) parallel against the transparent bottom (1.2) of the vat (1.1). The 3D printer has a computer-implemented control unit (not shown) for controlling the overall operation. The 3D printer (1) is provided without any means for completely blocking the pivotal movement of the pivotably held building platform (2.1). Therefore, during the entire 3D printing process, namely in the use state, the building platform (2.1) can be held freely pivotably.

In a preferred embodiment, the 3D printer (1) has a force measuring device (not shown) for force-controlled lowering and raising of the building platform (2.1).

According to the invention, the receiving apparatus (2) is a stand-alone unit that can be provided separately from the 3D printer (1) to customers for retrofitting. The receiving apparatus (2) comprises the building platform (2.1) and the pivoting device (2.2) for pivotally holding the building platform (2.1). The receiving apparatus (2) is suitable for use with the 3D printer (1) and for detachably connecting the building platform (2.1) to the transport apparatus (1.5) of the 3D printer (1).

In another preferred embodiment of the receiving apparatus (2), the pivoting device (2.2) comprises a rotating joint (2.22) for holding the building platform (2.1), and a receiving arm (2.21) to which the rotating joint (2.22) is connected. In another preferred embodiment, the rotating joint (2.22) is a universal ball joint (not shown). In another preferred alternative embodiment, the building platform (2.1) is supported by a pin (2.222) in a hole (2.223) in the receiving arm (2.21), wherein the hole (2.223) allows sufficient clearance for the pivotal movement.

In a further preferred embodiment, the building platform (2.1) is preferably spring-supported in the receiving apparatus (2). Preferably, one or more springs (2.221) are arranged between the receiving arm (2.21) and the building platform (2.1). The plurality of suspension springs (2.221) are preferably placed off axis relative to pivoting device (2.2).

In the following description, the operation of the 3D printer (1) according to one embodiment is explained in more detail.

Figure 5:
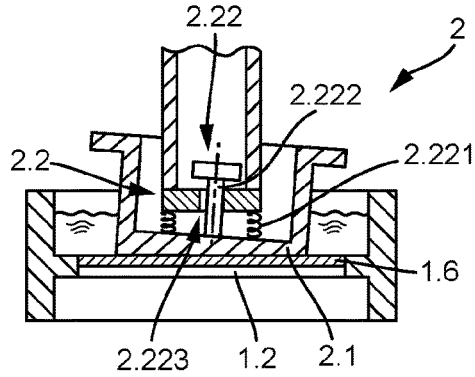
FIG. 5—shows a schematic partial view of the 3D printer of FIG. 4 at the beginning of a print job, where by lowering, the bottom of the building platform has been aligned with the projection plane.
Figure 6:
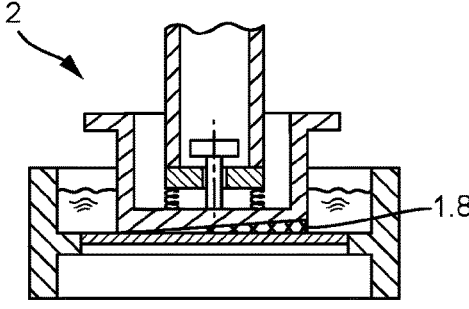
FIG. 6—shows a schematic partial view of the 3D printer from FIG. 4 during exposure or curing of the first layers, so that one or more wedges are cured.
Figure 7:
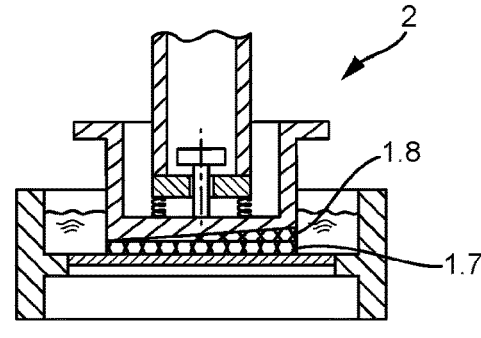
FIG. 7—shows a schematic partial view of the 3D printer from FIG. 4 during exposure or curing, whereby the one or more wedges have grown until the parallelism of the current building plane and the projection plane has been achieved.

In the embodiment shown (see FIG. 4), the building platform (2.1) is movably, in particular pivotably, connected to the receiving arm (2.21). It is brought into a defined position by the springs (2.221) (or also by gravity force). When lowered, the underside of the building platform (2.1) aligns with the projection plane (see FIG. 5). When exposing or curing the first layers (1.7), if the surfaces of the building platform (2.1) and the projection plane were previously non-parallel, one side or one corner of the building platform (2.1) will lift off first. This cures the one or more wedges (1.8) (see FIG. 6). The one or more wedges (1.8) grow until parallelism of the current building plane and the projection plane is achieved (see FIG. 7). During the first few layers the projection is now preferably carried out over the one or more pre-defined areas which may be equal or less than the entire maximum projectable area. From this point on, a bond can be established on the building surface.

The invention also provides a method of controlling the computer-implemented 3D printer (1), which is executable by the control unit by means of a corresponding computer readable code. According to this control method, the building platform (2.1) is lowered, preferably force-controlled, until it lies parallel on the projection plane; the building platform (2.1) is then moved upwards and set one layer thickness higher; the projection now preferably takes place over the one or more pre-defined areas which may be equal or less than the entire maximum projectable area; in the case of a non-parallel gap below the building platform (2.1), the resin (1.3) hardens only where it is located in the gap; after multiple repetitions of the peeling off, resetting one layer thickness higher and projection, one or more wedges (1.8) are formed below the building platform (2.1), the underside of which represents a plane parallel to the projection plane. During the entire 3D printing process, namely in the use state, the building platform (2.1) can be held freely pivotably to allow forming of the wedges (1.8) until a plane parallel to the projection plane is formed. The number of multiple repetitions before the main 3D printing process of the component and its support structures is started, can be set to an empirical predefined number. Alternatively, force sensors in the force measurement device or one or more optical sensors can be used to observe the course of the pivoting motion. The transport apparatus (1.5) can move the building platform (2.1) vertically as well as horizontally within the vat (1.1).

In a preferred embodiment, the cross-sections of the one or more wedges in the one or more predefined areas exactly match the geometry of the first layer to be printed in the generating step i.e., the main 3D printing process. The said first layer to be printed belongs to the component and its support structures to be printed. The positions of the one or more wedges (1.8) are defined by the first layer of the component. However, alternatively the one or more wedges may also be larger in size than the geometry of the first layer to be printed in the generating step.

The invention claimed is:

1. A 3D printer comprising:
   a vat having an at least partially transparent bottom for receiving liquid photoreactive resin for generating a solid component;
   a building platform for pulling the solid component layer by layer out of the vat;
   a projector for projecting a layer geometry onto the transparent bottom;
   a transport apparatus for moving the building platform at least downward and upward in the vat; and
   a receiving apparatus for detachably connecting said building platform to said transport apparatus;
   wherein
   the receiving apparatus includes a pivoting device for pivotably holding the building platform and is arranged to parallelly abut the underside of the building platform against the transparent bottom of the vat during lowering by the transport apparatus, wherein the 3D printer is provided without any means for completely blocking pivotal movement of the pivotably held building platform.

2. 3D printer according to claim 1, further comprising a force measuring device for force-controlled lowering and raising of the building platform.

3. A receiving apparatus comprising a building platform for use with a 3D printer according to claim 1, for detachably connecting the building platform to the transport apparatus of the 3D printer, wherein the receiving apparatus further comprises a pivoting device for pivotably holding the building platform and is arranged to abut the underside of the building platform in parallel against the transparent bottom of the vat when lowered by the transport apparatus, wherein the receiving apparatus is provided without any means for completely blocking pivotal movement of the pivotably held building platform.

4. The receiving apparatus according to claim 3, wherein the pivoting device comprises a rotating joint for holding the building platform and a receiving arm to which the rotating joint is connected.

5. The receiving apparatus according to claim 3, wherein the building platform is spring-supported in the receiving apparatus through a plurality of suspension springs placed off axis relative to pivoting device.

6. Method of controlling a 3D printer during a 3D printing process, comprising:
   lowering a pivotably held building platform, in a force-controlled manner, until the underside of the building platform abuts parallelly against a transparent bottom of a vat;
   moving the building platform is then moved upwards and setting the building platform one layer-thickness higher;
   projecting layer geometries, over one or more pre-defined areas, so that if there is a non-parallel gap below the building platform, resin only cures where it is located in the gap;
   forming, after repetition of peeling, upward moving, re-setting one further layer-thickness higher and projection over the one or more pre-defined areas, one or more wedges under the building platform, the underside of which represents a parallel plane to the transparent bottom of the vat; and
   generating a component and its support structures on the one or more wedges by layer-wise projecting the layer geometries thereof first after completion of the one or more wedges, wherein pivotal movement of the pivotably held building platform is not completely blocked by any means during the 3D printing process so that it can freely pivot.

7. Method of controlling a 3D printer according to claim 6, wherein the positions of the one or more wedges are defined by the first layer of the component.

\* \* \* \* \*